US012765446B2

(12) United States Patent
Conboy et al.

(10) Patent No.: US 12,765,446 B2
(45) Date of Patent: Oct. 20, 2026

(54) SYSTEMS AND METHODS FOR MONITORING SEED PLACEMENT WITHIN THE GROUND

(71) Applicant: CNH Industrial America LLC, New Holland, PA (US)

(72) Inventors: Michael Christopher Conboy, Chicago, IL (US); Trevor Stanhope, Oak Lawn, IL (US)

(73) Assignee: CNH Industrial America LLC, New Holland, PA (US)

( * ) Notice: Subject to any disclaimer, the term of this patent is extended or adjusted under 35 U.S.C. 154(b) by 1392 days.

(21) Appl. No.: 17/514,860

(22) Filed: Oct. 29, 2021

(65) Prior Publication Data

US 2023/0140374 A1 May 4, 2023

(51) Int. Cl.
*A01C 7/10* (2006.01)
*A01C 5/06* (2006.01)

(52) U.S. Cl.
CPC .............. *A01C 7/105* (2013.01); *A01C 5/062* (2013.01)

(58) Field of Classification Search
CPC ................................ A01C 7/105; A01C 5/062
See application file for complete search history.

(56) References Cited

U.S. PATENT DOCUMENTS 6,941,225 B2 9/2005 Upadhyaya et al.
8,365,679 B2 * 2/2013 Landphair ............... G06F 11/30 701/50
9,239,382 B2 1/2016 Paglieroni et al.
9,585,307 B2 3/2017 Holland
10,262,413 B2 4/2019 Strnad et al.
(Continued)

FOREIGN PATENT DOCUMENTS

| | | | | |
|---|---|---|---|---|
| EP | 2227932 A1 * | 9/2010 | ........... | A01C 21/005 |
| EP | 3300563 A1 * | 4/2018 | ............. | A01C 7/105 |
| EP | 2227932 B1 * | 3/2019 | ........... | A01C 21/005 |

OTHER PUBLICATIONS

Kenneth O. M. Mapoka, et al. "Application of Ground Penetrating Radar in Measuring Corn seeds (CS) Spacing and Planting depth in different soils," 2018 ASABE Annual International Meeting, Detroit, MI, Jul. 29-Aug. 1, 2018. Paper No. 1801351. DOI: 10.13031/aim.201801351, Iowa State University Digital Repository (15 pages) https://core.ac.uk/download/pdf/212845618.pdf.
(Continued)

*Primary Examiner* — Anne Marie Antonucci
(74) *Attorney, Agent, or Firm* — Dority & Manning, P.A.

(57) ABSTRACT

A method for monitoring seed placement within the ground during the performance of a planting operation includes receiving, with a computing device, a timing signal associated with a detection of a seed to be deposited within soil by a row unit as the row unit is actively depositing seeds within the soil, and identifying, with the computing device, a time associated with when the seed will pass through a detection zone of a seed placement sensor supported relative to the row unit based on the timing signal. The seed placement sensor is configured to detect the seed as planted underneath a surface of the soil. In addition, the method includes evaluating, with the computing device, data collected by the seed placement sensor during the identified time to determine a seed placement parameter associated with seed.

20 Claims, 5 Drawing Sheets

FIG. 2

(56) References Cited

U.S. PATENT DOCUMENTS

| | | | |
|---|---|---|---|
| 10,371,814 B2 | 8/2019 | Chan et al. | |
| 10,768,331 B2 | 9/2020 | Koch et al. | |
| 10,806,072 B2 | 10/2020 | Zielke | |
| 10,820,488 B2 * | 11/2020 | Schoeny ................ | A01C 7/105 |
| 10,895,636 B2 | 1/2021 | Gonzáles Valdés et al. | |
| 2016/0274235 A1 | 9/2016 | Martin et al. | |
| 2016/0316613 A1 | 11/2016 | Burk et al. | |
| 2018/0224537 A1 | 8/2018 | Taylor | |
| 2020/0359559 A1 | 11/2020 | Koch et al. | |
| 2020/0390026 A1 | 12/2020 | Walter et al. | |

OTHER PUBLICATIONS

Daniel Flippo, et al., "Sensing System for Real-Time Measurement of Seed Spacing, Depth, and Geo-Location of Corn," Jan. 2019, DOI: 10.13031/trans.13593 (1 page) https://www.researchgate.net/publication/338467905_Sensing_Sytem_for_Real-Time_Measurement_of_Seed_Spacing_Depth_and_Geo-Location_of_Corn_A_Proof-of-Concept_Study.

* cited by examiner

SYSTEMS AND METHODS FOR MONITORING SEED PLACEMENT WITHIN THE GROUND

FIELD

The present disclosure generally relates to planting operations performed using a planting implement, such as a planter or a seeder, and, more particularly, to systems and methods for monitoring seed placement within the ground during the performance of a planting operation.

BACKGROUND

Planting implements, such as planters, are generally known for performing planting operations within a field. A typical planter includes a plurality of row units, with each row unit including various ground engaging tools for creating a furrow within the soil, placing a seed within the furrow, and closing the soil around the seed. Typically, to monitor the operation of a given row unit, a sensor will often be provided with unit's seed tube for detecting seeds as they pass through the tube before being deposited within the furrow. Such sensor data is then used to estimate certain seed-related parameters, such as the seeding rate. However, since the seed tube sensor is detecting the seeds prior to their deposition within the soil, the associated sensor data cannot be used to accurately estimate parameters related to the placement of seeds within the soil, particularly since the seeds may bounce, roll, or otherwise land off-target as they are dropped from the seed tube into the furrow. Seeds may also be displaced during the furrow closing process, which cannot be detected using the seed tube sensor.

Accordingly, an improved system and method for monitoring seed placement within the ground during the performance of a planting operation would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a method for monitoring seed placement within the ground during the performance of a planting operation. The method includes receiving, with a computing device, a timing signal associated with a detection of a seed to be deposited within soil by a row unit as the row unit is actively depositing seeds within the soil, and identifying, with the computing device, a time associated with when the seed will pass through a detection zone of a seed placement sensor supported relative to the row unit based on the timing signal, the seed placement sensor configured to detect the seed as planted underneath a surface of the soil. In addition, the method includes evaluating, with the computing device, data collected by the seed placement sensor during the identified time to determine a seed placement parameter associated with seed.

In another aspect, the present subject matter is directed to a system for monitoring seed placement within the ground during the performance of a planting operation. The system includes a row unit configured to deposit seeds within the soil, with the row unit including a furrow opening assembly configured to create a furrow in the soil for depositing seeds and a furrow closing assembly configured to close the furrow after the seeds having been deposited therein. The system also includes a timing sensor supported relative to the row unit and being configured to detect a seed to be deposited within the soil by the row unit, a seed placement sensor supported relative to the row unit and being configured to detect the seed as planted underneath a surface of the soil, and a computing system communicatively coupled to the timing sensor and the seed placement sensor. The computing system is configured to receive a timing signal from the timing sensor associated with the detection of the seed to be deposited within the soil by the row unit, identify a time associated with when the seed will pass through a detection zone of the seed placement sensor based on the timing signal, and evaluate data collected by the seed placement sensor during the identified time to determine a seed placement parameter associated with seed.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
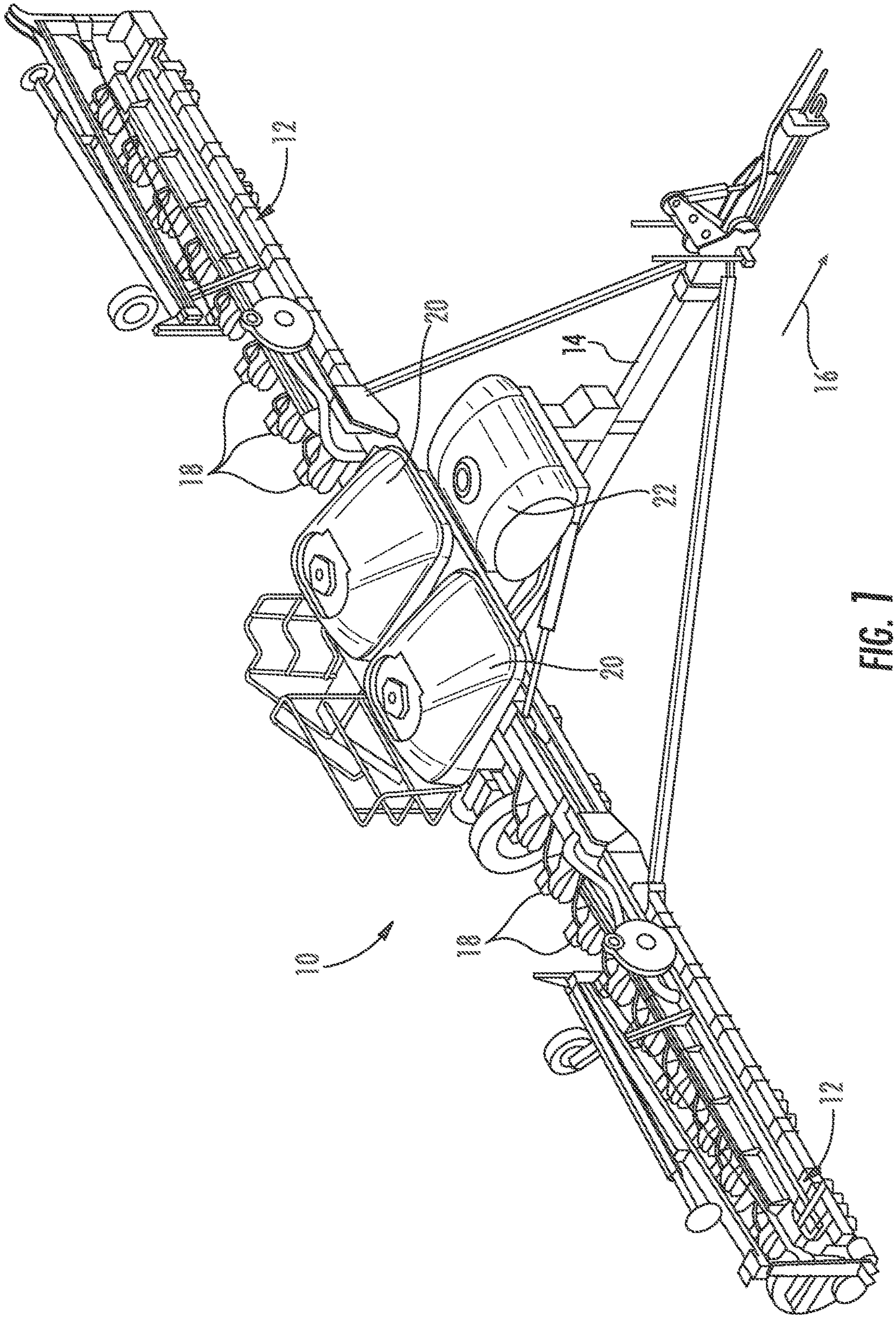
FIG. 1 illustrates a perspective view of one embodiment of a planting implement in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring seed placement within the ground during the performance of a planting operation. Specifically, in several embodiments, a planting implement may include a plurality of row units, with each row unit including various ground engaging tools for creating a furrow within the soil, placing a seed within the furrow, and closing the furrow around the seed. Additionally, in accordance with aspects of the present subject matter, one or more of the row units may also include or be associated with a seed placement sensor configured to detect seeds within the ground. For instance, the seed placement sensor may correspond to a non-contact sensor configured to detect seeds located underneath the soil (e.g., post-closing of the furrow), such as a ground-penetrating radar. The data generated by the seed placement sensor may then be communicated to a computing system configured to determine and/or monitor one or more seed-related placement parameters based on the sensor data, such as the seed depth, seed position, and/or the like, as well as one or more other seed placement parameters, such as relative seed spacing, seed population, and/or the like. The monitored seed placement parameter may additionally include missing seeds, as the data generated by the seed placement sensor may also be used to determine whether a seed is absent or is otherwise missing at a location at which one would expect a seed to be located. Thus, the seed placement parameter may be used to detect both the present and absence of seeds underneath the soil.

Additionally, in accordance with aspects of the present subject matter, the computing system may be configured to rely on a timing signal(s) that provides the system with an input for determining when to activate the seed placement sensor and/or when to sample data received from the sensor(s). For example, in one embodiment, the computing system may be configured to receive one or more timing signals from a "timing" sensor that provides an indication of the instance or moment at which each seed is about to deposited into the furrow or the moment at which each seed otherwise passes by a given location within a component of a row unit. Based on such timing signals, the computing system may be configured to determine when the associated seed placement sensor will subsequently pass over each respective seed (e.g., when the seed will likely come into the field of view or detection zone of the sensor). The computing system may then be configured to activate the seed placement sensor to collect data across a given time period determined based on when the sensor will pass over each respective seed and/or sample the data received from the seed placement sensor across such time period.

It should be appreciated that the disclosed systems and methods may generally allow for data received from a seed placement sensor to be evaluated more effectively and efficiently. For instance, when using a non-contact sensor to detect seeds located underneath the soil surface, a significant amount of noise may be contained within the sensor data and/or the sensor may detect numerous objects in addition to seeds (e.g., small rocks, etc.). By using the seed-related timing signals provided by the timing sensor, the system can selectively activate the sensor and/or selectively sample the received sensor data within a given time frame or window across which it is likely that a given seed is passing through the detection zone of the seed placement sensor (such time window being also referred to herein as the "evaluation window"). For instance, when operating the seed placement sensor in a non-continuous sensing mode, the computing system may be configured to determine when to activate/deactivate the sensor to selectively collect data across the appropriate evaluation window. Similarly, when operating the seed placement sensor in a continuous sensing mode, the computing system may be configured to selectively sample the sensor data (e.g., from the continuous data trace or moving image) by selecting a subset of the data collected across a given time period corresponding to the evaluation window along which each seed will be passing through the field of view of the seed placement sensor. Such selective collection and/or sampling of the data can be used to improve the confidence that seeds are being identified in the seed placement data as opposed to other similarly shaped/sized objects underneath the soil.

In addition to using the timing signals to selectively activate the sensor and/or sample the sensor data, the timing signals may also be used adjust or update one or more of the operating parameters of the seed placement sensor. For instance, in one embodiment, the operating frequency, power, and/or any other suitable operating parameter of the seed placement sensor may be varied based on the timing signals. For example, when the seed placement sensor corresponds to a ground penetrating radar, the frequency band across which the sensor is operating may be varied such that sensor operates at a first frequency band for the evaluation window across which each seed will be passing through the detection zone of the seed placement sensor and at a second frequency band for the time periods between each evaluation window.

Referring now to drawings, FIG. 1 illustrates a perspective view of one embodiment of a planting implement (e.g., a planter 10) in accordance with aspects of the present subject matter. As shown in FIG. 1, the planter 10 may include a laterally extending toolbar or frame assembly 12 connected at its middle to a forwardly extending tow bar 14 to allow the planter 10 to be towed by a work vehicle (not shown), such as an agricultural tractor, in a direction of travel (e.g., as indicated by arrow 16). The frame assembly 12 may generally be configured to support a plurality of seed planting units (or row units) 18. As is generally understood, each row unit 18 may be configured to deposit seeds at a desired depth beneath the soil surface and at a desired seed spacing as the planter 10 is being towed by the work vehicle, thereby establishing rows of planted seeds. In some embodiments, the bulk of the seeds to be planted may be stored in one or more hoppers or seed tanks 20. Thus, as seeds are planted by the row units 18, a pneumatic distribution system may distribute additional seeds from the seed tanks 20 to the individual row units 18. Additionally, one or more fluid tanks 22 may store agricultural fluids, such as insecticides, herbicides, fungicides, fertilizers, and/or the like.

It should be appreciated that, for purposes of illustration, only a portion of the row units 18 of the planter 10 have been shown in FIG. 1. In general, the planter 10 may include any number of row units 18, such as 6, 8, 12, 16, 24, 32, or 36 row units. In addition, it should be appreciated that the lateral spacing between row units 18 may be selected based on the type of crop being planted. For example, the row units 18 may be spaced approximately 30 inches from one another for planting corn, and approximately 15 inches from one another for planting soybeans.

It should also be appreciated that the configuration of the planter 10 described above and shown in FIG. 1 is provided only to place the present subject matter in an exemplary field of use. Thus, it should be appreciated that the present subject matter may be readily adaptable to any manner of planter configuration or any other planting implement configuration, including seeders.

Figure 2:
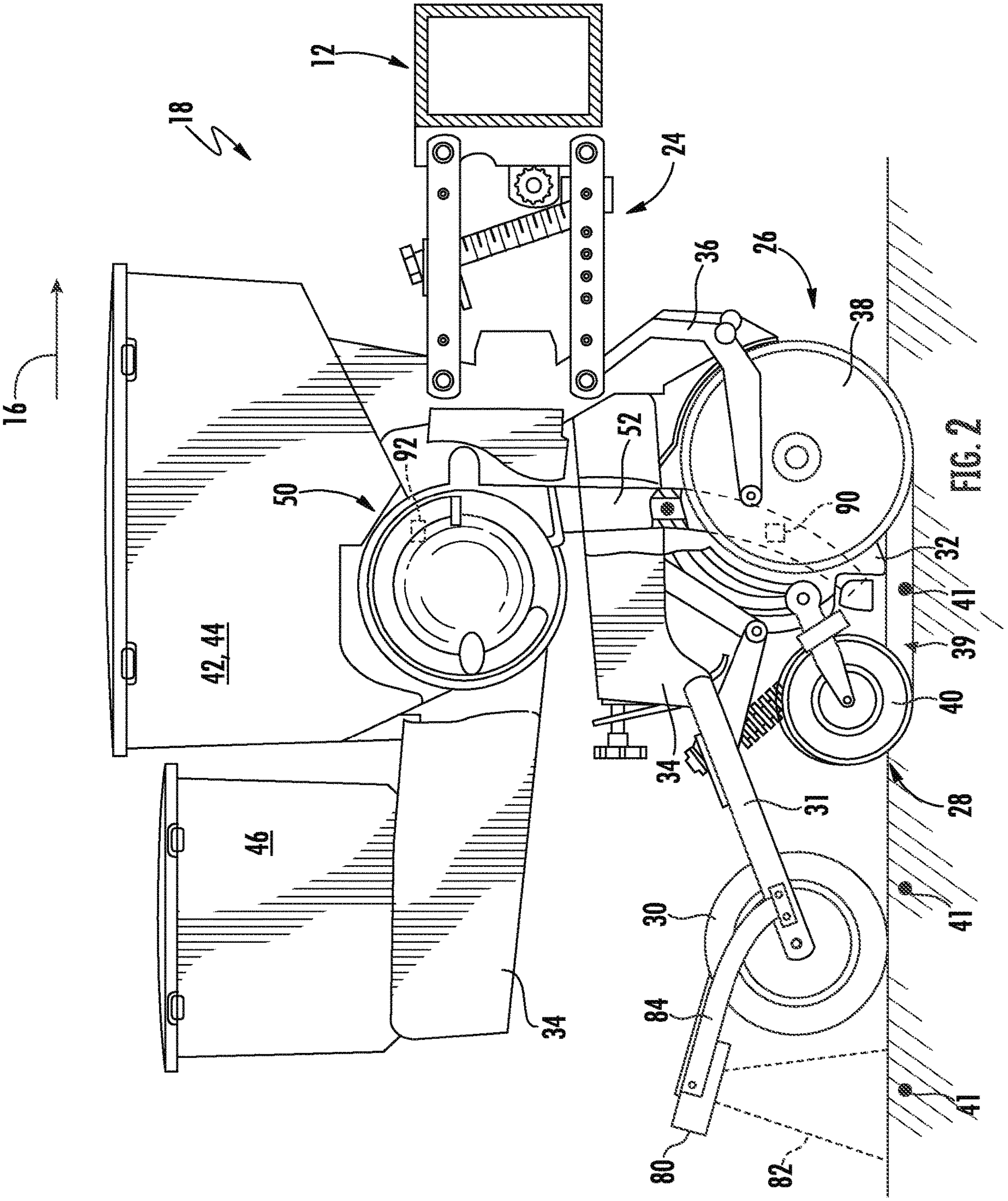
FIG. 2 illustrates a side view of one embodiment of a row unit suitable for use with a planting implement in accordance with aspects of the present subject matter.

Referring now to FIG. 2, a side view of one embodiment of a row unit 18 is illustrated in accordance with aspects of the present subject matter. As shown, the row unit 18 includes a linkage assembly 24 configured to mount the row unit 18 to the toolbar or frame assembly 12 of the planter 10. As shown in FIG. 2, the row unit 18 also includes a furrow opening assembly 26, a furrow closing assembly 28, and a press wheel 30. In general, the furrow opening assembly 26 may include a gauge wheel (not shown) operatively connected to a frame 34 of the row unit 18 via a support arm 36. Additionally, the opening assembly 26 may also include one or more opening disks 38 configured to excavate a trench or furrow 39 in the soil, and a firming point 32. The gauge wheel is not shown to better illustrate the opening disk 38. As is generally understood, the gauge wheel may be configured to engage the surface of the field, with the height of the opening disk(s) 38 being adjusted with respect to the position of the gauge wheel to set the desired depth of the furrow 39 being excavated. Moreover, as shown, the furrow closing assembly 28 may include a closing disk(s) 40 configured to close the furrow 39 after seeds 41 have been deposited therein. The press wheel 30 may then be configured to roll over the closed furrow 39 to firm the soil over the seed 41 and promote favorable seed-to-soil contact.

Additionally, as shown in FIG. 2, the row unit 18 may include one or more seed hoppers 42, 44 and a fluid tank 46 supported on the frame 34. In general, the seed hopper(s) 42, 44 may be configured to store seeds 41 received from the seed tanks 20, which are to be deposited within the furrow 39 as the row unit 18 moves over and across the field. For instance, in several embodiments, the row unit 18 may include a first seed hopper 42 configured to store seeds of a first seed type and a second hopper 44 configured to store seeds of a second seed type. However, both seed hoppers 42, 44 may be configured to store the same type of seeds. Furthermore, the fluid tank 46 may be configured to store fluid received from the fluid tank 22 (FIG. 1), which is to be sprayed onto the seeds dispensed from the seed hoppers 42, 44.

Moreover, the row unit 18 may include a seed meter 50 provided in operative association with the seed hopper(s) 42, 44. In general, the seed meter 50 may be configured to uniformly release seeds 41 received from the seed hopper(s) 42, 44 for deposit within the furrow 39. For instance, in one embodiment, the seed meter 50 may be coupled to a suitable vacuum source (e.g., a blower powered by a motor and associated tubing or hoses) configured to generate a vacuum or negative pressure that attaches the seeds to a rotating seed disk of the seed meter 50, which controls the rate at which the seeds 41 are output from the seed meter 50 to an associated seed tube 52. As shown in FIG. 2, the seed tube 52 may extend vertically from the seed meter 50 toward the ground to facilitate delivery of the seeds 41 output from the seed meter 50 to the furrow 39.

Referring still to FIG. 2, one or more seed placement sensors 80 may also be supported relative to each row unit 18. In general, the seed placement sensor(s) 80 may be configured to generate data indicative of the placement of the deposited seeds 41 within the soil, thereby allowing one or more related placement parameters to be determined for the associated planting operation (e.g., individual seed depth/position, relative seed spacing, seed population, missing seeds, etc.). In several embodiments, the seed placement sensor(s) 80 may be configured to detect seeds 41 located underneath the soil surface (e.g., post-closing of the furrow). In such embodiments, the seed placement sensor(s) 80 may generally be configured to be installed on or otherwise positioned relative to the row unit 18 such that the sensor(s) 80 has a field of view or detection zone 82 directed towards the soil surface at a location aft of the furrow closing assembly 28 (e.g., relative to the direction of travel 16 of the planter 10). For instance, as shown in FIG. 2, the seed placement sensor(s) 80 is supported relative to the row unit 18 (e.g., via a support arm 84 coupled to an associated support arm 31 of the press wheel 30) such that the sensor(s) 80 is configured to generate data associated with a portion of the field located immediately behind the aft-most ground-engaging tool of the row unit 18 (e.g., the press wheel 30). However, in other embodiments, the detection zone 82 of the sensor(s) 80 may be directed at any other suitable location that allows the sensor(s) 80 to detect seeds 41 positioned underneath the soil surface, such as at a location between the furrow closing assembly 28 and the press wheel 30.

In several embodiments, the seed placement sensor(s) 80 may correspond to a non-contact sensor configured to detect seeds 41 located underneath the soil surface. For instance, in one embodiment, the seed placement sensor(s) 80 may be a ground penetrating radar configured to detect seeds deposited underneath the soil surface. In such an embodiment, the seed placement sensor(s) 80 may, for example, include one or more pairs of transmitters and receivers, with the transmitter(s) being configured to transmit electromagnetic waves towards and through the soil and the receiver(s) being configured to detect the waves as reflected off sub-surface features (e.g., seeds). In other embodiments, the seed placement sensor(s) 80 may correspond to any other suitable non-contact sensor capable of detecting seeds deposited underneath the soil surface.

Additionally, the row unit 18 may also include one or more sensors 90, 92 for generating data indicative of the timing and frequency of seeds 41 being deposited into the furrow 39 between the opening and closing assemblies 26, 28. For instance, as shown in the illustrated embodiment, the row unit 18 may include one or more seed tube sensors 90 configured to detect seeds as they fall or otherwise travel through the seed tube 52. In such an embodiment, the seed tube sensor 90 may generally correspond to any suitable sensor or sensing device configured to detect seeds passing through the seed tube 52 (e.g., whether falling through the tube 52 via gravity or by being conveyed through the tube 52 via a driven belt or other seed-transport means extending within the seed tube 52). For example, the seed tube sensor 90 may correspond to an optical sensor (e.g., a break-beam sensor or a reflectance sensor), a microwave sensor, a Hall-effect sensor, and/or the like.

In addition to the seed tube sensor 90 (or as an alternative thereto), the row unit 18 may include other sensors for generating data indicative of the timing and frequency of seeds 41 being deposited into the furrow 39. For instance, as shown in the illustrated embodiment, the row unit 18 may include one or more seed meter sensors 92 configured to detect seeds 41 that are being or will be discharged from the seed meter 50. Specifically, in one embodiment, the seed meter sensor(s) 92 may correspond to a post-singulation sensor positioned within the seed meter 50 such that the sensor's detection zone is aligned with a location within a post-singulation region of the seed meter 50: (1) across which the seed disc or other seed transport member is rotated following the singulator (not shown) of the seed meter 50; and/or (2) through which each seed 41 to be discharged from seed meter 50 passes following release of the seed 41 from the seed disc. In such an embodiment, the seed meter sensor 92 may generally correspond to any suitable sensor or sensing device configured to detect seeds that are being or will be discharged from the seed meter 50. For example, the seed meter sensor 92 may correspond to an optical sensor (e.g., a break-beam sensor or a reflectance sensor), a microwave sensor, a Hall-effect sensor, and/or the like.

As will be described below, in several embodiments, one or more of the sensors 90, 92 described above may be configured to function as a timing sensor for providing timing signals to an associated computing system. Specifically, in several embodiments, the timing sensor may be configured to generate timing signals that can be used by the computing system to determine when to activate the seed placement sensor(s) 80 to collect data and/or when to sample the sensor data generated by the seed placement sensor(s) 80. For example, based on the timing signals received from the timing sensor, the computing system may be configured to determine when each seed 41 is passing underneath the seed placement sensor(s) 80 or is otherwise located within the sensor's field of view or detection zone 82. In such an embodiment, the computing system may activate the seed placement sensor(s) 80 and/or sample the data generated by such sensor(s) 80 as each seed 41 passes by the location of the sensor's detection zone 82 to allow for the detection of each seed 41. Such information can then be analyzed or evaluated by the computing system to determine one or more related placement parameters associated with the deposited seeds, such as individual seed depths/positions, the relative seed spacing, the seed population, missing seeds, and/or the like.

It should be appreciated that the configuration of the row unit 18 described above and shown in FIG. 2 is provided only to place the present subject matter in an exemplary field of use. Thus, it should be appreciated that the present subject matter may be readily adaptable to any manner of seed planting unit configuration.

Figure 3:
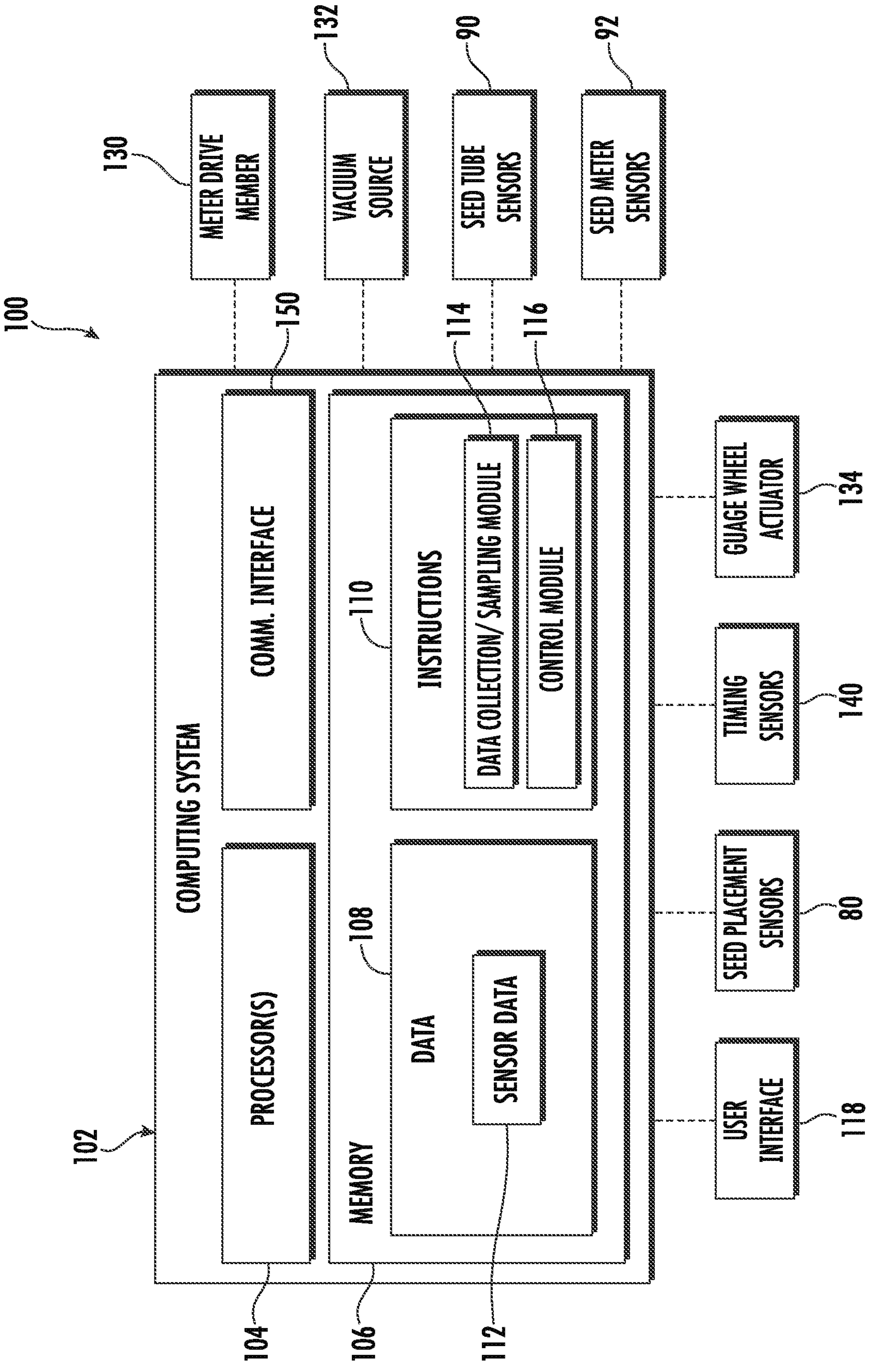
FIG. 3 illustrates a schematic view of one embodiment of a system for monitoring seed placement within the ground during the performance of a planting operation in accordance with aspects of the present subject matter.

Referring now to FIG. 3, a schematic view of one embodiment of a system 100 for monitoring seed placement within the ground during the performance of a planting operation is illustrated in accordance with aspects of the present subject matter. In general, the system 100 will be described herein with reference to the planting implement 10, the row unit 18, and related components described above with reference to FIGS. 1 and 2. However, it should be appreciated that the disclosed system 100 may generally be utilized with any planter or seeder having any suitable implement configuration and/or with row units having any suitable row unit configuration.

In several embodiments, the system 100 may include a computing system 102 and various other components configured to be communicatively coupled to and/or controlled by the computing system 102, such as a meter drive member 130 configured to rotationally drive the seed meter 50, a vacuum source 132 configured to apply a vacuum or negative pressure to the seed disk or seed transport member of the seed meter 50, a gauge wheel actuator 134 configured to actuate gauge wheel of the row unit 18 to adjust the current planting depth, and/or various sensors configured to monitor one or more operating parameters associated with each row unit 18. For example, the computing system 102 may be communicatively coupled to one or more seed placement sensors 80 (e.g., one sensor per row unit) configured to generate data indicative of the placement of the deposited seeds within the soil, such as one or more ground penetrating radars configured to detect seeds located underneath the soil surface. In addition, the computing system 102 may be communicatively coupled to one or more additional sensors configured to generate data indicative of the timing and frequency of the seeds being deposited within the furrow by each row unit, such as a seed tube sensor 90 and/or a seed meter sensor 92 provided in association with each row unit 18. As indicated above, in several embodiments, one or more of such sensors 90, 92 may be used as a timing sensor(s) 140 within the disclosed system 100 for generating a timing signal(s) that provides the computing system 102 with a timing input for determining when to activate the seed placement sensor 80 and/or sample the data generated by seed placement sensor 80.

It should be appreciated that the computing system 102 may correspond to any suitable processor-based device(s), such as a computing device or any combination of computing devices. Thus, as shown in FIG. 3, the computing system 102 may generally include one or more processor(s) 104 and associated memory devices 106 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 106 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 106 may generally be configured to store information accessible to the processor(s) 104, including data 108 that can be retrieved, manipulated, created and/or stored by the processor(s) 104 and instructions 110 that can be executed by the processor(s) 104.

In several embodiments, the data 108 may be stored in one or more databases. For example, the memory 106 may include a sensor database 112 for storing sensor data and/or other relevant data that may be used by the computing system 102 in accordance with aspects of the present subject matter. For instance, during operation of the planting implement, data from all or a portion of the sensors communicatively coupled to the computing system 102 may be stored (e.g., temporarily) within the sensor database 112 and subsequently used to determine one or more parameter values associated with the operation of the planting implement, including any or all data generated by the timing sensor(s) 140 (e.g., the seed tube sensor 90 and/or the seed meter sensor 92) and/or the seed placement sensor 80.

Additionally, in several embodiments, the instructions 110 stored within the memory 106 of the computing system 102 may be executed by the processor(s) 104 to implement a data collection/sampling module 114. In general, the data collection/sampling module 114 may be configured to activate/deactivate each seed placement sensor 80 to selectively collect data associated with the placement of seeds within the ground and/or to selectively sample the data received from the seed placement sensor 80. For example, as will be described below, based on the timing signals received from the timing sensor(s) 140, the computing system 102 may be configured to activate each seed placement sensor 80 for a given period of time selected based on the determined time window or evaluation window across which each deposited seed will pass through the detection zone 82 of the sensor 80, thereby allowing for the selective collection of sensor data in view of the timing signals. Alternatively, when each seed placement sensor 80 is configured to continuously collect data, the computing system 102 may be configured to selectively sample the data received from each seed placement sensor 80 based on the timing signals from the timing sensor(s) 140, thereby allowing the computing system 102 to evaluate data associated with each instance at which it is determined or estimated that a given seed will be passing through the detection zone 82 of the seed placement sensor 80. The sensor data collected and/or sampled may then analyzed by the data collection/sampling module 216 to determine or estimate one or more seed placement parameters associated with the deposited seeds, such as individual seed depths/positions, relative seed spacing, seed population, missing seeds, etc.

Referring still to FIG. 3, in several embodiments, the instructions 110 stored within the memory 106 of the computing system 102 may also be executed by the processor(s) 104 to implement a control module 116. In general, the control module 116 may be configured to initiate a control action based on the seed placement parameter(s) determined using the data generated by the seed placement sensor(s) 80. For instance, in one embodiment, the control module 116 may be configured to provide a notification to the operator indicating the determined seed placement parameter(s), such as the current seed depth or seed spacing. For instance, in one embodiment, the control module 116 may cause a visual or audible notification or indicator to be presented to the operator via an associated user interface 118 provided within the cab of the vehicle used to tow the planting implement 10.

In other embodiments, the control module 116 may be configured to execute an automated control action designed to adjust the operation of the row unit 18 or the planting implement 10. For instance, in one embodiment, the computing system 102 may be configured to automatically adjust the depth of the furrow being cut into the soil (e.g., by adjusting the relative position of the gauge wheel and opening assembly 26 via control of the gauge wheel actuator 134) based on placement data associated with the current depth at which the seeds are being planted. Similarly, in one embodiment, the computing system 102 may be configured to automatically adjust the operation of the seed meter 50 to vary the rate at which seeds are being deposited within the soil based on placement data associated with the current seed spacing and/or seed population. For instance, the computing system 102 may be configured to increase or decrease the speed at which the seed disc of the seed meter 50 is being rotated (e.g., via control of the meter drive member 130) if it is determined that the seed spacing needs to be adjusted relative to a target seed spacing range. Similarly, the computing system 102 may be configured to increase or decrease the vacuum pressure applied to the seed meter 50 (e.g., via control of the vacuum source 132) if it is determined that the current seed population is too low or too high relative to a target seed population range. As another example, the detection of missing seeds may be indicative of plugging or issues with the closing system. In such instances, the computing system may be configured to automatically adjust the operation of the row unit 18 and/or the planting implement 10 to address issues related to plugging/closing.

Moreover, as shown in FIG. 3, the computing system 102 may also include a communications interface 150 to provide a means for the computing system 102 to communicate with any of the various other system components described herein. For instance, one or more communicative links or interfaces (e.g., one or more data buses) may be provided between the communications interface 150 and the meter drive member 130, the vacuum source 132, and the gauge wheel actuator 134 to allow the computing system 102 to transmit control signals for controlling the operation of such components. Similarly, one or more communicative links or interfaces (e.g., one or more data buses) may be provided between the communications interface 150 and the various sensors 80, 90, 92, 140 to allow the associated sensor data to be transmitted to the computing system 102.

It should be appreciated that, in general, the computing system 102 may include suitable computing device(s) that is configured to function as described herein. In several embodiments, the computing system 102 may form part of an active planting system configured to perform a planting operation, such as by including a vehicle controller of a work vehicle configured to tow an associated planting implement 10 and/or an associated implement controller of the planting implement 10.

As indicated above, each timing sensor 140 may generally correspond to any suitable sensor(s) and/or sensing device(s), including any one or a combination of the various sensors described herein. For example, in several embodiments, each timing sensor 140 may correspond to the seed tube sensor 90 for the respective row unit 18. Specifically, since the seed tube sensor 90 is generally configured to detect seeds as they pass through the seed tube 52, the sensor 90 may be configured to generate "timing signals" that can be used by the computing system 102 to identify the instance or moment at which seeds are passing by a known location within the seed tube 52. In such an embodiment, by knowing or detecting certain parameters associated with the row unit 18, such as the relative positioning of the seed tube sensor 90 within the seed tube 52, the seeding rate, the relative position of the row unit on the implement 10, the turning radius of the implement 10 (if applicable), the geometry and/or dimensions of the seed tube 52, the relative height of the seed tube 52 above the furrow, the relative positioning of the seed tube 52 and the seed placement sensor 90 (e.g., the longitudinal distance between the outlet of the seed tube 52 and the seed placement sensor 90), and the current ground speed of the planting implement 10 and/or the row unit, the computing system 102 may be configured to utilize the "timing signals" received from the seed tube sensor 90 as a timing mechanism or means to determine when each individual seed will be passing through the detection zone 82 of the seed placement sensor 80. For instance, the data generated by the seed tube sensor 90 may be used to calculate a time delay between the instance at which the seed is detected by the seed tube sensor 90 and the instance at which the seed will begin to pass through the detection zone 82 of the seed placement sensor 80 (or an instance right before the seed will begin pass through the sensor's detection zone 82).

As another example, each timing sensor 140 may correspond to the seed meter sensor 92 of the respective row unit 18. Specifically, since the seed meter sensor 92 is generally configured to detect seeds as they pass through the seed meter 50, the sensor 92 may be configured to generate "timing signals" that can be used by the computing system 102 to identify the instance or moment at which seeds are passing by a known location within the seed meter 50. In such an embodiment, by knowing or detecting certain parameters associated with the row unit 18, such as the relative positioning of the seed meter sensor 92 within the seed meter 50, the seeding rate, the relative position of the row unit on the implement 10, the turning radius of the implement 10 (if applicable), the geometry and/or dimensions of the seed tube 52, the relative height of the seed tube 52 above the furrow, the relative positioning of the seed tube 52 and the seed placement sensor 80 (e.g., the longitudinal distance between the outlet of the seed tube 52 and the seed placement sensor 80), and the current ground speed of the planting implement 10 and/or the row unit 18, the computing system 102 may be configured to utilize the "timing signals" received from the seed meter sensor 92 as a timing mechanism or means to determine when each individual seed will be passing through the detection zone 82 of the seed placement sensor 80. For instance, similar to that described above with reference to the sensor data derived from the seed tube sensor 90, the data generated by the seed meter sensor 92 may be used to calculate a time delay between the instance at which the seed is detected by the seed meter sensor 92 and the instance at which the seed will begin to pass through the detection zone 82 of the seed placement sensor 80 (or an instance right before the seed will begin pass through the sensor's detection zone 82).

As indicated above, by using the timing signals from the timing sensor(s) 140 to calculate a time delay between the detection of a pre-planted seed (e.g., as it passed through a component of the row unit 18) and the time at which the subsequently planted seed will begin to pass through (or is about to pass through) the detection zone 82 of the seed placement sensor 80, the computing system 102 can selectively collect and/or selectively sample sensor data to simplify the detection of planted seeds located below the soil surface. For instance, when the seed placement sensor 80 is configured to collect placement data in a non-continuous mode, the computing system 102 may be configured to activate the seed placement sensor following the time delay such that the sensor 80 collects data for a limited period of time generally corresponding to the time across which the seed passes through the sensor's detection zone 82. Such selective collection of the seed placement data generally reduces the overall amount of data that must be processed by the computing system 102 and also focuses the data collection only across the areas of interest in which seeds should be located. Alternatively, when the seed placement sensor 80 is configured to collect placement data in a continuous mode, the computing system 102 may be configured to only sample the sensor data received from the seed placement sensor 80 across a limited time period initiated at the expiration of the time delay. Such selective sampling of the seed placement data generally allows the computing system 102 to filter out data associated with the areas of the field extending between seed placements and, thus, focuses the data analysis only across the areas of interest in which seeds should be located.

Figure 4:
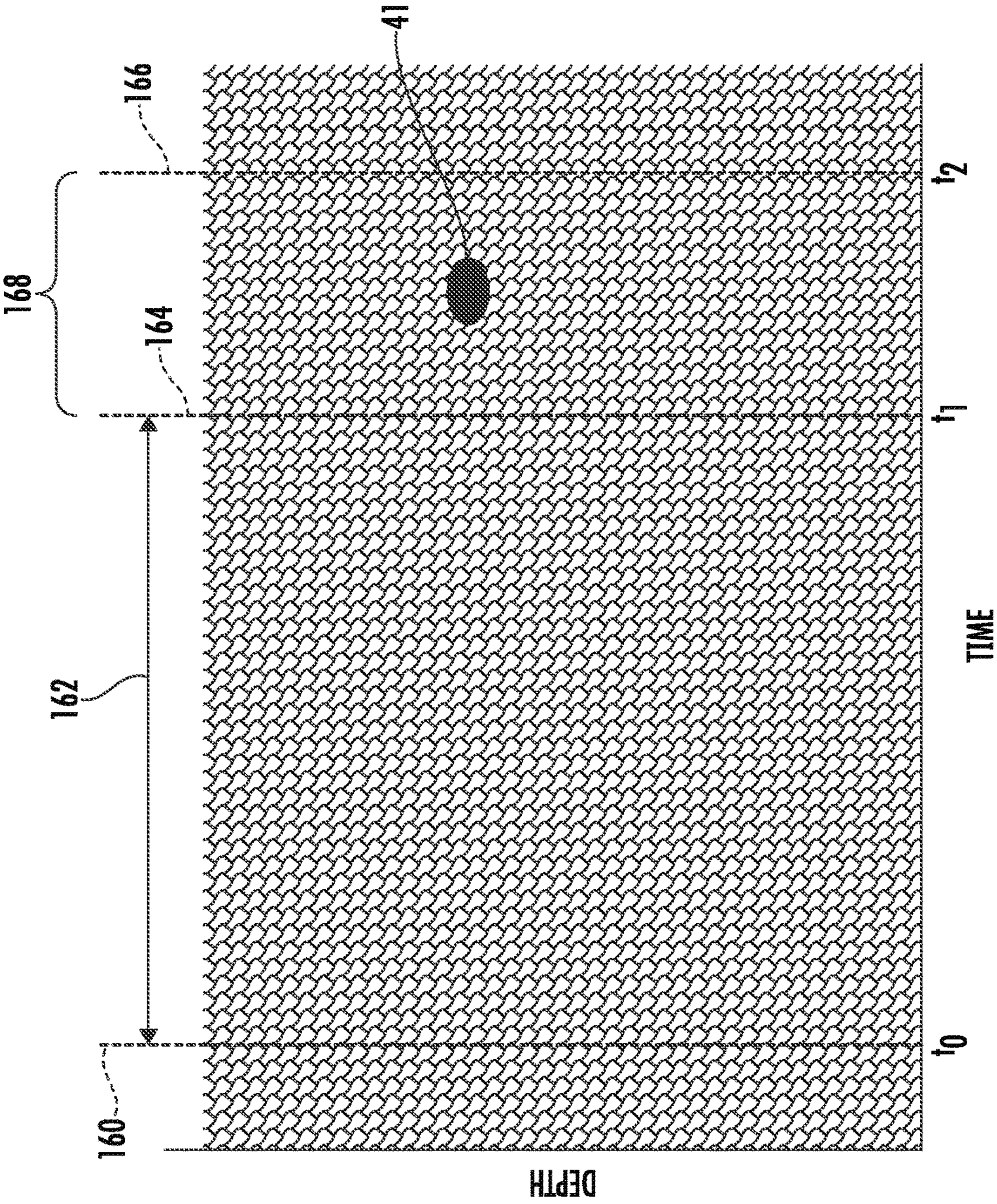
FIG. 4 illustrates an example data trace or depth image that may be generated over time in accordance with aspects of the present subject matter, particularly illustrating an example evaluation window that can be defined based on timing signals received from the disclosed timing sensors.

An exemplary application of the above-described timing signals will now be described with reference to FIG. 4. Specifically, FIG. 4 illustrates an example data trace or depth image that may be generated over time based on the data received from a seed placement sensor 80. In the illustrated example, the seed placement sensor 80 is configured to operate in a continuous data collection mode in which the sensor 80 continuously captures data associated with subsurface features, such as a continuous depth image that may be generated using a ground penetrating radar. As illustrated schematically along the time-varying depth image or data trace shown in FIG. 4, a timing signal may be received from the timing sensor 140 at an initial time (e.g., time $t_0$ indicated by dashed line 160 in FIG. 4) at which the timing sensor 140 detects a seed 41 passing by its location (e.g., its location within the seed tube 52 or the seed meter 50) as the seed 41 is being directed towards the furrow for deposit therein. Based on the receipt of such timing signal, the computing system 102 may be configured to calculate a time delay 162 between the instance at which the seed 41 is detected by the timing sensor 140 and the instance at which the detected seed 41 will begin to pass through (or right before the seed 41 passes through) the detection zone 82 of the seed placement sensor 80 (e.g., the time between time $t_0$ and time $t_1$ indicated by dashed line 164 in FIG. 4). The time delay 162 can then be used to identify or select a data evaluation window 168 (e.g., between time $t_1$ and $t_2$ indicated by dashed line 166 in FIG. 4) across which the data from the seed placement sensor 80 will be sampled to identify the position/depth of the seed 41 underneath the soil surface. Alternatively, when the seed placement sensor 80 is operated in a non-continuous data collection mode, the identified or selected evaluation window 168 may correspond to the time period across which the sensor 80 is activated to allow for the collection of seed placement data.

It should be appreciated that, by using the above-described data collection and/or sampling methodology, seed placement data may be determined for each individual seed deposited within the soil. Moreover, by analyzing such data over time across a given number of seeds, additional placement parameters may be determined for the deposited seeds, such as seed spacing, the seed population, and/or the like.

Additionally, it should be appreciated that the identified or selected evaluation window 168 for each seed may also be used as the basis for adjusting or varying the operating parameters of the seed placement sensor 80. For instance, various sensor operating parameters, such as the operating frequency, power, and/or the like, may be varied based on whether the sensor 80 is collecting data within or outside the evaluation window 168 associated with each seed 41. For example, when the seed placement sensor 80 corresponds to a ground penetrating radar, the frequency band across which the sensor 80 is operating may be varied such that sensor operates at a first frequency band across evaluation window 168 and at a second frequency band for the time periods between each evaluation window 168.

Figure 5:
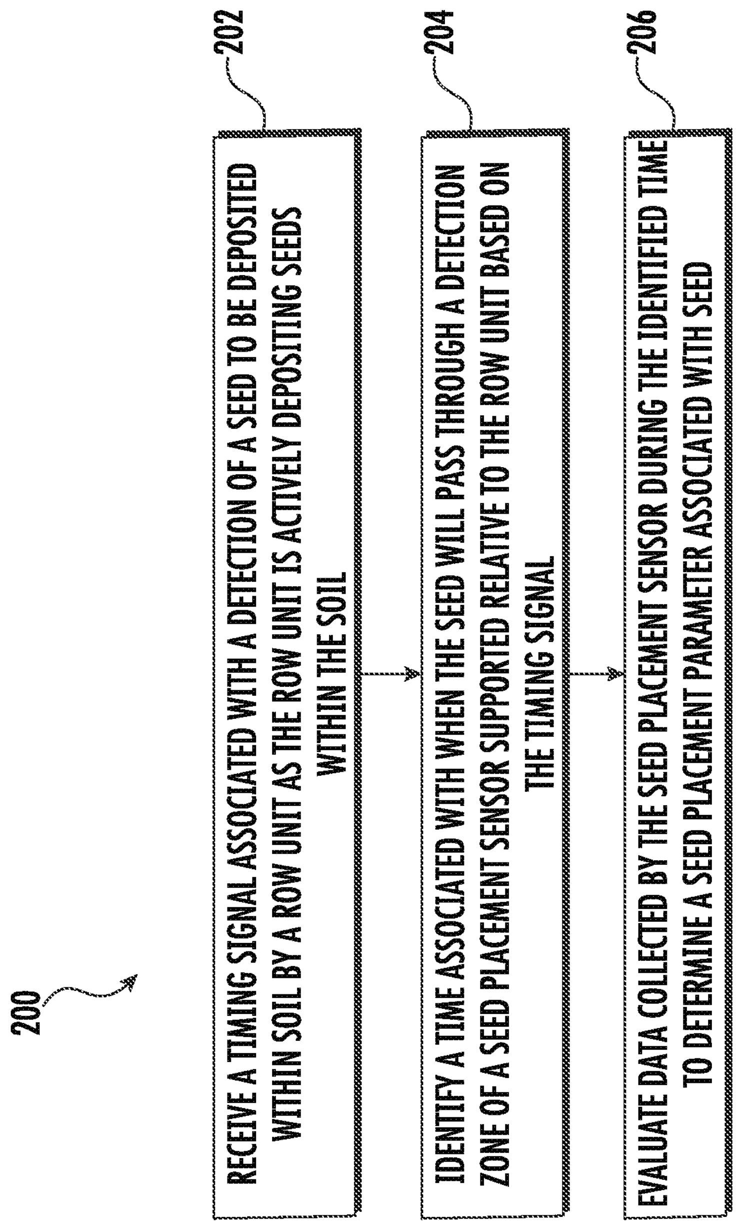
FIG. 5 illustrates a flow diagram of one embodiment of a method for monitoring seed placement within the ground during the performance of a planting operation in accordance with aspects of the present subject matter.

Referring now to FIG. 5, a flow diagram of one embodiment of a method 200 for monitoring seed placement within the ground during the performance of a planting operation is illustrated in accordance with aspects of the present subject matter. In general, the method 200 will be described herein with reference to the planting implement 10, row unit 18, and system 100 described above with reference to FIGS. 1-4. However, it should be appreciated by those of ordinary skill in the art that the disclosed method 200 may generally be utilized to monitor seed placement in associated with any planting implement having any suitable implement configuration, any row unit having any suitable row unit configuration, and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include receiving a timing signal associated with a detection of a seed to be deposited within soil by a row unit as the row unit is actively depositing seeds within the soil. For instance, as indicated above, the computing system 102 may be communicatively coupled to a timing sensor 140 (e.g., a seed tube sensor 90 or seed meter sensor 92), with the computing system 102 being configured to receive timing signals from the sensor 102 as the row unit 18 is being used to actively plant seeds within a field.

Additionally, at (204), the method 200 may include identifying a time associated with when the seed will pass through a detection zone of a seed placement sensor supported relative to the row unit based on the timing signal. Specifically, as described above, the computing system 102 may be configured to calculate the time at which a detected seed will pass through the detection zone 82 of the seed placement sensor 80 based on the timing signals received from the timing sensor 140. For instance, in one embodiment, the computing system 102 may calculate a time delay between an instance at which the seed is detected by the timing sensor 140 and an instance at which the seed is about to or begins to pass through the detection zone 82 of the seed placement sensor 80. The time delay may then be used, for example, to identify or select an evaluation window 180 across which the seed placement sensor 80 will be activated and/or data from the sensor 80 will be sampled.

Moreover, as shown in FIG. 5, at (206), the method 200 may include evaluating data collected by the seed placement sensor during the identified time to determine a seed placement parameter associated with seed. For instance, as indicated above, the computing system 102 may be configured to activate the seed placement sensor 80 and/or sample data received from the sensor 80 based on the identified time. Regardless, the data associated with the identified time (e.g., the identified evaluation window) may then be evaluated to determine one or more seed placement parameters, such as an individual seed position/depth of each seed. Such seed-related information may also be used to calculate other seed-related placement parameters, such as the relative seed spacing and/or the current speed population.

It is to be understood that, in several embodiments, the steps of the method 200 are performed by the computing system 102 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, in several embodiments, any of the functionality performed by the computing system 102 described herein, such as the method 200, is implemented in software code or instructions which are tangibly stored on a tangible computer readable medium. The computing system 102 loads the software code or instructions via a direct interface with the computer readable medium or via a wired and/or wireless network. Upon loading and executing such software code or instructions by the computing system 102, the computing system 102 may perform any of the functionality of the computing system 102 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for monitoring seed placement within the ground during the performance of a planting operation, the method comprising:

receiving, with a computing device, a timing signal associated with a detection of a seed to be deposited within soil by a row unit as the row unit is actively depositing seeds within the soil;

identifying, with the computing device, an evaluation window associated with when the seed will pass through a detection zone of a seed placement sensor supported relative to the row unit based on the timing signal, the seed placement sensor configured to detect the seed as planted underneath a surface of the soil;

selectively utilizing, with the computing device, the seed placement sensor based on the evaluation window; and evaluating, with the computing device, data collected by the seed placement sensor during the evaluation window to determine a seed placement parameter associated with seed.

2. The method of claim 1, wherein receiving the timing signal comprises receiving the timing signal from a timing sensor configured to detect the seed as it passes through a component of the row unit.

3. The method of claim 2, wherein receiving the timing signal from the timing sensor comprises receiving the timing signal from a seed tube sensor configured to detect the seed passing through a seed tube of the row unit or receiving the timing signal from a seed meter sensor configured to detect the seed passing through a seed meter of the row unit.

4. The method of claim 1, wherein identifying the evaluation window associated with when the seed will pass through the detection zone of the seed placement sensor comprises determining a time delay between an instance at which the seed is detected for generating the timing signal and an instance at which the seed is about to or begins to pass through the detection zone of the seed placement sensor.

5. The method of claim 4, wherein the evaluation window opens following the time delay.

6. The method of claim 1, wherein selectively utilizing the seed placement sensor based on the identified time comprises temporarily activating the seed placement sensor over the evaluation window such that the seed placement sensor collects the data as the seed passes through the detection zone.

7. The method of claim 1, wherein selectively utilizing the seed placement sensor based on the identified time comprises sampling a subset of the data collected by the seed placement sensor over the evaluation window;

wherein evaluating the data collected by the seed placement sensor comprises evaluating the sampled subset of the data collected by the seed placement sensor.

8. The method of claim 1, further comprising adjusting, with the computing device, an operating parameter of the seed placement sensor based on the evaluation window.

9. The method of claim 1, further comprising determining, with the computing device, a seed spacing or seed population for the seeds deposited within the soil by the row unit based at least in part on the determined seed placement parameter.

10. The method of claim 1, further comprising automatically adjusting, with the computing device, operation of the row unit based on the seed placement parameter.

11. A system for monitoring seed placement within the ground during the performance of a planting operation, the system comprising:

a row unit configured to deposit seeds within the soil, the row unit including a furrow opening assembly configured to create a furrow in the soil for depositing seeds and a furrow closing assembly configured to close the furrow after the seeds having been deposited therein;

a timing sensor supported relative to the row unit and being configured to detect a seed to be deposited within the soil by the row unit;

a seed placement sensor supported relative to the row unit and being configured to detect the seed as planted underneath a surface of the soil; and a computing system communicatively coupled to the timing sensor and the seed placement sensor, the computing system being configured to:

receive a timing signal from the timing sensor associated with the detection of the seed to be deposited within the soil by the row unit;

identify an evaluation window associated with when the seed will pass through a detection zone of the seed placement sensor based on the timing signal;

selectively utilize the seed placement sensor based on the evaluation window; and evaluate data collected by the seed placement sensor during the evaluation window to determine a seed placement parameter associated with seed.

12. The system of claim 11, wherein the timing sensor is configured to detect the seed as it passes through a component of the row unit.

13. The system of claim 12, wherein the timing sensor comprises one of a seed tube sensor configured to detect the seed passing through a seed tube of the row unit or a seed meter sensor configured to detect the seed passing through a seed meter of the row unit.

14. The system of claim 11, wherein the computing system is configured to identify the evaluation window at least in part by determining a time delay between an instance at which the seed is detected by the timing sensor and an instance at which the seed is about to or begins to pass through the detection zone of the seed placement sensor.

15. The system of claim 14, wherein the computing system is further configured to selectively utilize the seed placement sensor over the evaluation window after expiration of the time delay.

16. The system of claim 11, wherein the computing system is configured to selectively utilize the seed placement sensor by temporarily activating the seed placement sensor over the evaluation window such that the seed placement sensor collects the data as the seed passes through the detection zone.

17. The system of claim 11, wherein the computing system is configured to selectively utilize the seed placement sensor by sampling a subset of the data collected by the seed placement sensor over the evaluation window, the sampled subset of the data being evaluated to determine the seed placement parameter.

18. The system of claim 11, wherein the seed placement parameter comprises at least one of a position or depth of the seed.

19. The system of claim 11, wherein the seed placement sensor comprises a ground-penetrating radar.

20. The system of claim 19, wherein the detection zone of the ground penetrating radar is located aft of the closer assembly relative to a direction of travel of the row unit.

* * * * *